United States Patent Office 3,254,370
Patented June 7, 1966

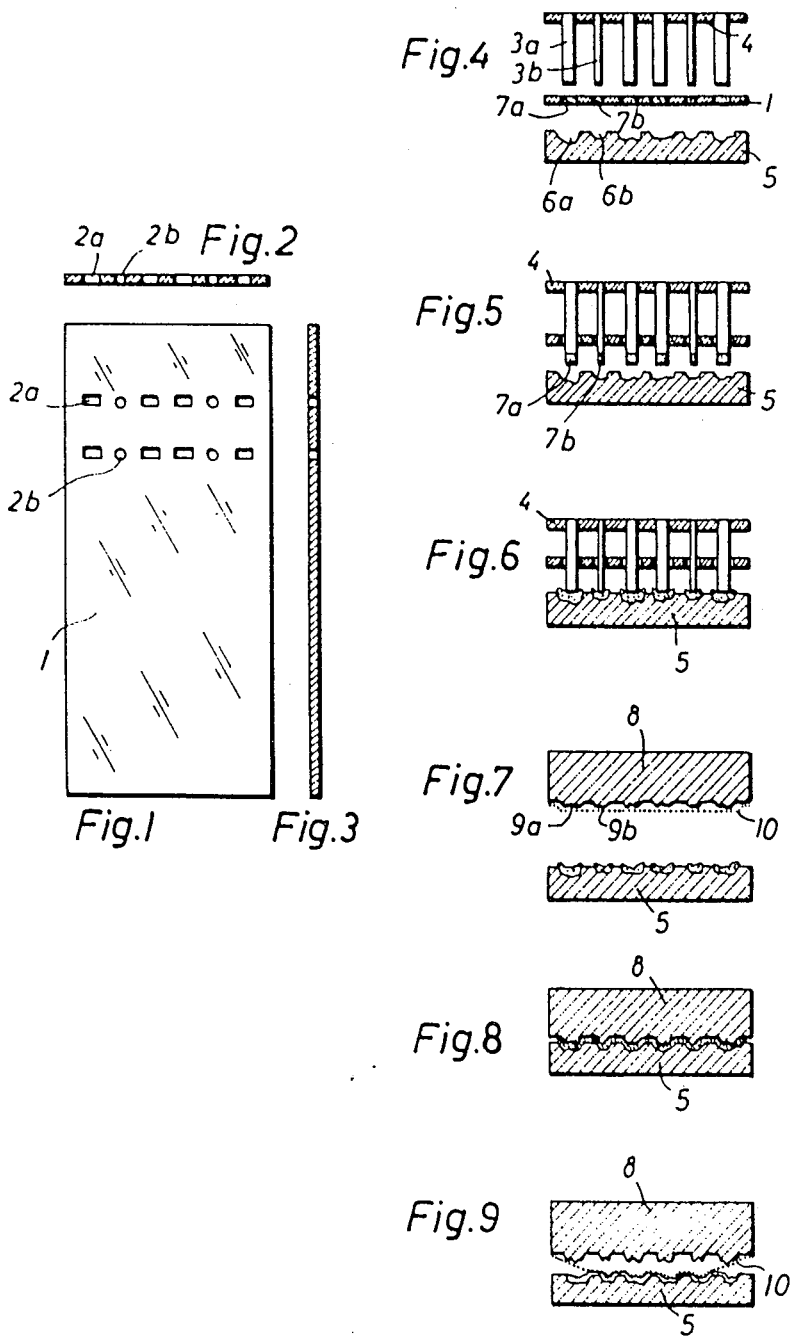

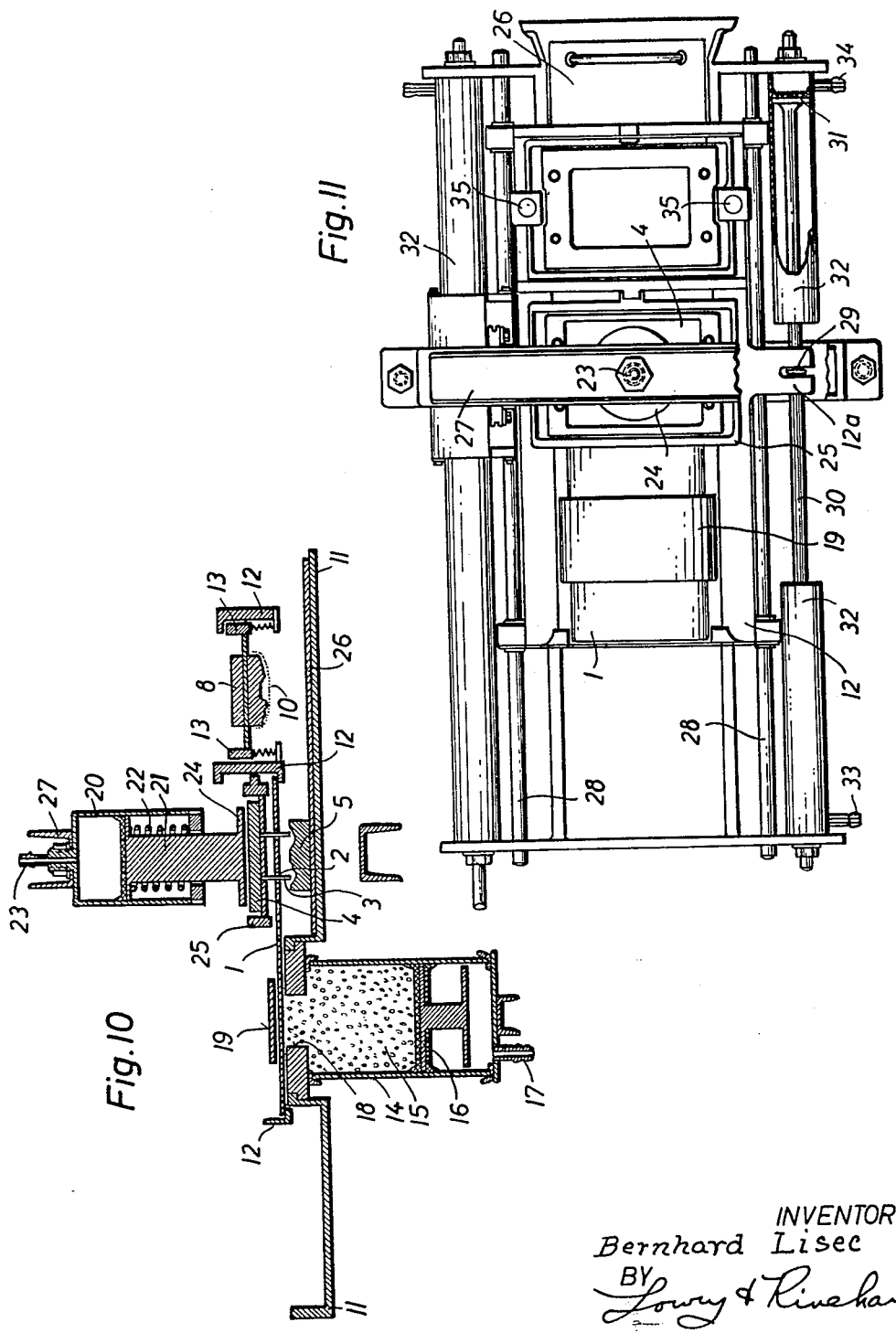

3,254,370
APPARATUS FOR THE MANUFACTURE OF ARTIFICIAL TEETH
Bernhard Lisec, Gmunden, Upper Austria, Austria, assignor to Vita Zahnfabrik H. Rauter K.G., Sackingen, Hochrhein, Germany
Filed Aug. 13, 1962, Ser. No. 216,462
Claims priority, application Germany, Aug. 16, 1961, V 21,176
1 Claim. (Cl. 18—30)

This invention relates to an apparatus for mechanically positioning pasty compositions in cavities of molds, more especially ceramic dental compositions for the molding of unfinished artificial teeth.

The positioning of introduction of ceramic compositions into the cavities of molds for the manufacture of artificial teeth is a substantially manual operation. This is essentially to be attributed to the properties of the ceramic compositions in their plastic state, it not only being a question that the ceramic dental composition is to be introduced in a measured quantity into the cavities, but the composition in the cavity of the tooth mold itself still requires shaping. An additional factor is that occasionally up to nine or more coloring substances must be placed in the mold of a tooth. An additional difficulty is caused by the weight of these individual, differently colored substances. These weights can fluctuate from about 0.5 milligram with the smallest coloring substance up to about 1 gram with the largest substance. One obstacle with the mechanical arrangement is also provided by the large number of different molds and mold sizes which are necessary for carrying out a manufacturing program.

It is an object of this invention to overcome these difficulties and to provide apparatus for the shaping operation and the production of unfinished artifical teeth.

The invention is characterized by the fact that an apertured plate is used for measuring the composition, the volume of each aperture when it is completely filled corresponding to the measured quantity of the ceramic composition. The plate is held with the apertures filled by the composition over the associated cavities of the tooth mold, the plug of composition being ejected from the apertures of the plate. The injection of the plug of the composition into the tooth mold cavity is then effected in such a way that the composition positioned in the mold cavity is subjected to a pressing and a spreading action. Not only is the measuring of the proportions of composition made easy in this way and capable of being carried out mechanically, but the positioning of the measured composition in the form of plugs in the cavity of the tooth mold can likewise be carried out simply and reliably. Provision is also made to ensure that the plug of composition is safely attached to the mold.

Due to the fact that the pin ejecting the composition from the apertured plate not only brings the free plug of composition up to the cavity of the tooth mold, but drives this, to some extent, into the cavity with a pressing action, an increase in area of the plug at its surface of contact with the cavity is obtained, while the surface of contact of the plug with the pin remains unchanged. This difference in the contact surface is sufficient for a greater adhesion between the plug of composition and the mold to be produced when the pin is retracted and the composition remains adhering to the mold cavity. Thereafter, the required contour corresponding to the tooth shape is given to the plug of composition in the tooth mold by applying the upper part of the mold, i.e. the mold upper die. In this way, the unfinished tooth can be built up from the necessary number of separate plugs of composition to be introduced into the mold cavity.

The plate to be used for the measuring or proportioning comprises apertures extending completely therethrough, the diameters of such apertures being determined by the size of the mold cavity and the position of the composition element to be arranged in the cavity, and the quantity of this composition is advantageously determined by the thickness of the plate. In this arrangement, each aperture has associated with it a plunger pin adapted to the aperture. It is advantageous to use a thin net or gauze between the lower die of the mold and the upper die thereof. The result hereby achieved is that when the upper die is raised, the ceramic composition does not remain adhering to the ram surface participating in the formation of the tooth shape. The thin gauze is applied elastically to the composition, then pressure is applied by the ram disposed on the mold upper die. Since the ram only comes into contact through the meshes of the gauze, with only a fraction of its shaping surface touching the composition, the ram can easily be raised. The gauze can, in its turn, be easily detached from the composition pressed into the mold cavity, since the gauze surface is only gradually lifted. The impression formed in the composition by the gauze filaments is insignificant and disappears with further processing of the unfinished tooth.

The actuating means as a whole is preferably constructed in such a way that a cylinder accommodating the composition and serving for the filling of the proportioning or measuring plate, and a cylinder actuating the plunger pins are provided, between which the proportioning plate can be moved backwards and forwards. The movement of the upper die of the tooth mold or the mold ram, is advantageously coupled with the movement of the proportioning plate. The proportioning plate can be supported by a carriage which is constructed to reciprocate. The proportioning plate and the mold ram are to be so mounted on the carriage that the mold ram is opposite the bottom die of the mold when the proportioning plate is in the filling position. The result achieved in this way is that while the apertures of the proportioning plate are being filled again with the ceramic tooth composition, the bottom die and top die of the tooth mold are closed for molding the previously positioned composition plugs. Thereafter, the bottom die of the mold can be fed to another device for introducing additional composition plugs.

The nozzle of the composition cylinder preferably has associated therewith a closure plate which closes the measuring apertures on that side of the plate which is remote from the composition cylinder. In this way a complete filling of the measuring apertures is guaranteed. The composition cylinder is preferably arranged in interchangeable manner beneath the proportioning or measuring plate. This has the advantage that when the driving pressure for the composition ceases, this composition does not continue to be forced into the apertures because of its own weight. The composition cylinder and the actuating cylinders are provided with pistons, which are preferably actuated by a medium under pressure, for example pneumatically or hydraulically. In addition, it is advantageous for the actuation of all movable parts of the apparatus to be effected by a medium under pressure. A pneumatically or hydraulically operating mechanism is also to be considered for this purpose.

The invention is hereinafter explained by reference to the arrangements illustrated in the drawings, wherein:

FIGS. 1, 2 and 3 are respectively a plan view, a transverse section, and a longitudinal section of the proportioning or measuring plate to be used for carrying out the process according to the invention;

FIGS. 4, 5 and 6 show diagrammatically in partial sectional views the cooperation between the measuring plate and the plunger pins with the bottom die of the tooth mold to illustrate three different phases from before the introduction of the plug of composition until the latter has been positioned;

FIGS. 7 to 9 illustrate the cooperation between the bottom die and top die of the mold in different phases for mechanically carrying out this operation;

FIG. 10 is a longitudinal section through the apparatus; and

FIG. 11 is a top plan view of the apparatus shown in FIG. 10.

For mechanically carrying out the operation of subdividing the ceramic tooth composition into measured quantities and positioning the measured quantities in the corresponding cavities of the bottom die of the tooth mold, a measuring plate 1 is provided, this plate comprising as many apertures 2a, 2b as portions of composition are to be simultaneously introduced into any desired number of tooth molds. Depending on the size of the artificial tooth to be produced (molars, incisors and the like) the apertures 2a, 2b extending through the plate are made of different sizes. Their positions as such are also adapted to the positions at which the portions of the composition are to be introduced into the cavity of the tooth mold. The aperture can be of any desired cross-section, but generally apertures of circular or elongated cross-section are sufficient.

Associated with the individual apertures 2a, 2b are plunger pins 3a, 3b, which are fixedly arranged on a support 4, for example, a supporting plate. Located beneath the apertured plate 1 is the tooth mold 5, which is formed with corresponding cavities 6a, 6b for the production of artificial teeth of different shapes and sizes. When all three parts 1, 4 and 5 are suitably aligned relative to one another, the plugs of composition 7a, 7b located in the measuring plate 1 are ejected from the apertures 2a, 2b by the plunger pins 3a, 3b and forced to a position which can be accurately established by the position of the apertures relative to the tooth mold 5. With the parts in the positions shown in FIG. 5, the plugs of composition, lying on the heads of the plunger pins 3a, 3b, are conveyed into the cavities of the tooth mold 5. The plunger pins 3a, 3b are driven forward to such a degree that the plugs 7a, 7b are not only laid in the cavity of the tooth mold, but the plugs between the pins and the tooth mold are additionally subjected to a pressing or squeezing action. In this way, the plugs of composition lie in the cavities of the tooth mold with a larger surface than corresponds to the head surface of the plunger pins 3a, 3b. The plugs 7a, 7b of composition are thereby given a greater adhesion to the tooth mold 5, so that the plunger pins 3a, 3b can be lifted without any danger of the plugs 7a, 7b also being retracted with the return movement of the plunger pin.

The bottom die 5 of the tooth mold filled in this way is thereafter combined in a known manner with the top die 8 of the tooth mold, on which are arranged mold rams 9a, 9b which shape the free sides of the plugs located in the cavities of the bottom die. In order to be certain, when the operation is carried out mechanically, that the plugs do not remain adhering to the rams 9a, 9b when the mold sections are separated, a thin net or gauze 10 is provided between the mold sections. The gauze 10 prevents the molded composition element from adhering to the mold rams 9a, 9b. During the opening of the mold sections 5 and 8, the gauze 10 is gradually removed from the bottom die 5. The molded composition elements remain in their cavities.

FIGS. 10 and 11 show by way of example one embodiment of an actuating means for the mechanical proportioning and positioning of the composition in the tooth molds. Arranged on a base element 11 of the frame or the like is a carriage or slide 12, which is divided longitudinally. Arranged in one part is the measuring plate 1, which can be adjustably mounted in the carriage 12. The measuring plate 1 can be secured on the carriage 12 in any suitable manner so that it can easily be replaced. The other part of the carriage 12 is arranged to accommodate the top die 8 of the tooth mold. This can be mounted in a guideway 13, the position of the top die 8 being adjustable longitudinally and transversely. The measuring plate 1 is displaceable above a composition cylinder 14. The ceramic tooth composition 15 is disposed in the cylinder 14. This composition is advanced by a piston 16, to which leads a connection 17 for a pressure medium. The cylinder 14 comprises a nozzle 18 past which the measuring plate 1 is adapted to move. A closure plate 19 is preferably provided on that side of the plate 1 remote from the nozzle 18, the said plate being adapted to cover the apertures 2a, 2b of the measuring plate at the time of filling with the composition.

The additional cylinder 20 serves for actuating the supporting plate 4 comprising the pins 3. The cylinder 20 contains a piston 21, which is under the action of a return spring 22. Leading to the upper piston surface is a connection 23 for a pressure medium, more especially compressed air. The piston 21 is provided at its free end with a plate-shaped part 24. The support plate 4 is located in a slide member 25, which is arranged to be moved upwardly and downwardly, and can be moved back upwardly and forwardly with the carriage 12. The bottom die 5 of the tooth mold which is to be filled, is situated beneath the measuring plate 1. The bottom die 5 is arranged on a displaceable member 26 which is movable longitudinally or can be arranged to swivel about a center point. The cylinder 20 is fixed on a stirrup member 27. The slide member 12 is guided on rails 28 and is provided with a projection 12a (FIG. 11) engaging with a projection 29 located on a rod 30, the piston-like ends 31 of which slide in cylinders 32 for shifting the carriage. The connections for the cylinders 32 are indicated at 33 and 34. Arranged on the carriage are guide columns, on which is guided the slide member 13 carrying the top die 8 of the tooth mold.

The operation of the apparatus is as follows:

Starting from the position of the parts as shown in FIG. 10, in which the plunger pins 3 are located in the lowermost position, the piston 21, after shutting off the pressure medium to the cylinder 20, is moved upwardly under the action of the return spring 22. As a result, the pin support 4 is also moved upwardly, the press plate 24 being releasably connected to the support 4 in a suitable manner. With the press plate 23 completely retracted, there is an automatic withdrawal of the support 4. The carriage 12 is now displaced towards the left in the plane of the drawing, together with the measuring plate 1, until the apertures 2 are positioned above the nozzle 18 of the composition cylinder 4. The top die 8 of the tooth mold is correspondingly moved at the same time, so that it is suitably positioned above the bottom die of the tooth mold at the end of the movement of the carriage 12. There is now effected the filling of the apertures 2 with the composition 15, the apertures being closed on the other side by the closure plate 19. For this purpose, the pressure medium acts on the piston 16 and forces the composition into the apertures of the measuring plate 1. At the same time, the piston 21 is again set in motion under the action of a pressure medium. The press plate 24 strikes the upper surface of the top die 8 and, against the action of spring means, forces the top die 8 against the bottom die 5, in which the positioned plugs of composition are located. As soon as the top die 8 of the tooth mold has returned again to its uppermost position, when the piston 21 has also reached its uppermost position, the carriage 12 with the measuring plate 1 moves towards the right in the plane of the drawing until the apertures 2 filled with the composition are located above a freshly supplied tooth mold. Thereafter, the piston 21 is again placed under pressure by the pressure medium, it moves forward and forces the plunger pins 3 on the supporting plate 4, through the apertures of the measuring plate 1. As a result, the cavities of the bottom die 5 of the mold are filled with the plugs of composition. The cycle can be repeated as desired in this way.

A change to other mold sizes or supplies of composition plugs can be effected by changing the measuring plate and the plate with the plunger pins and the mold ram. Instead of arranging the measuring plate to reciprocate, it can also move on a circular path. The adaptation of the movements of the individual parts relative to one another can be effected pneumatically by means of a distributing slide valve and corresponding valves or also by electrical means. The actual positions are preferably to be locked, so that an accurate conformity of the parts operating with one another is guaranteed. Several of the devices according to the invention can be provided in juxtaposition.

What is claimed is:

Apparatus for automatically filling a part of a two-part mold with material to be molded therein comprising a plate having a plurality of apertures therethrough, each of said apertures having a volume sufficient to provide a mold cavity in one part of a two-part mold with material to be molded, means for positioning said apertured plate adjacent one part of a two-part mold with the appropriate apertures aligned with mold cavities, plunger means for forcing material to be molded from each of said apertures into the adjacent mold cavity, said plunger means including a plurality of plungers, said plurality of plungers having a size proportional to the size of the corresponding aperture, means for supporting said plungers in positions aligned with said apertures, said plungers and said apertures generally having sectional areas smaller than the sectional area of the corresponding mold cavity to reduce the amount of adhesion between the material and the plunger to less than the adhesion between the material and the cavity, another part of the two-part mold including molding rams aligned with the mold cavities of said one part, means for removing said measuring means and said plungers from adjacent said mold cavities and substituting said other part of said two-part mold, a gauze screen interposed between said one and other part of said two-part mold to prevent said material from adhering to said other part, a pressure device for operating said plunger and said other part of said two-part mold, said positioning means including a movable carriage which also supports said plungers, and means for filling said apertures with material to be molded.

References Cited by the Examiner

UNITED STATES PATENTS

| | | | |
|---|---|---|---|
| 1,111,802 | 9/1914 | Moomy | 264—316 XR |
| 1,587,462 | 6/1926 | Adams et al. | 264—316 |
| 1,822,172 | 9/1931 | Pfleumer et al. | |
| 1,920,317 | 8/1933 | Oexmann. | |
| 2,276,321 | 3/1942 | Lendahl. | |
| 2,394,260 | 2/1942 | Pfeilsticker | 264—334 |
| 2,476,631 | 7/1949 | Schumann | 18—47 |
| 2,763,049 | 9/1956 | Peebles | 18—47 |
| 2,774,104 | 12/1956 | Miller | 18—30 |
| 2,839,786 | 6/1958 | Alesi | 18—16 |

ALEXANDER H. BRODMERKEL, *Primary Examiner.*

ALFRED L. LEAVITT, *Examiner.*

J. R. DUNCAN, B. SNYDER, *Assistant Examiners.*